United States Patent

Egawa

[11] Patent Number: 5,878,067
[45] Date of Patent: Mar. 2, 1999

[54] LASER OSCILLATOR

[75] Inventor: Akira Egawa, Gotenba, Japan

[73] Assignee: Fanuc Ltd., Yamanashi, Japan

[21] Appl. No.: 911,439

[22] Filed: Aug. 12, 1997

Related U.S. Application Data

[63] Continuation of Ser. No. 602,721, filed as PCT/JP95/01199 Jun. 15, 1995 published as WO96/05638 Feb. 22, 1996, abandoned.

[30] Foreign Application Priority Data

Aug. 10, 1994 [JP] Japan .................................. 6-188586

[51] Int. Cl.$^6$ ...................................................... H01S 3/10
[52] U.S. Cl. ................................................ 372/27; 372/93
[58] Field of Search .................................. 372/93, 94, 92, 372/107, 108, 27, 29; 359/487, 496

[56] References Cited

U.S. PATENT DOCUMENTS

| | | | |
|---|---|---|---|
| 4,050,035 | 9/1977 | Wuerker et al. | 372/99 |
| 4,084,883 | 4/1978 | Eastman et al. | 372/99 |
| 4,208,636 | 6/1980 | German | 372/105 |
| 4,659,185 | 4/1987 | Aughton | 359/487 |
| 4,977,574 | 12/1990 | Karube | 372/93 |
| 5,023,886 | 6/1991 | Hobart et al. | 372/93 |
| 5,048,030 | 9/1991 | Hiiro | 372/68 |
| 5,175,736 | 12/1992 | Woodward et al. | 372/105 |
| 5,208,825 | 5/1993 | Ishihara | 372/99 |
| 5,293,389 | 3/1994 | Yano et al. | 372/27 |
| 5,307,367 | 4/1994 | Karube | 372/27 |
| 5,309,422 | 5/1994 | Kuroki et al. | 359/487 |
| 5,412,685 | 5/1995 | Egawa et al. | 372/93 |
| 5,513,035 | 4/1996 | Miyatake et al. | 359/487 |
| 5,579,159 | 11/1996 | Ito | 359/487 |
| 5,590,148 | 12/1996 | Szarmes | 372/105 |

FOREIGN PATENT DOCUMENTS

| | | |
|---|---|---|
| 0 358 769 | 3/1990 | European Pat. Off. . |
| 0 485 619 | 5/1992 | European Pat. Off. . |
| 61-10291 | 1/1986 | Japan . |
| 1-317696 | 12/1989 | Japan . |
| 5-275778 | 10/1993 | Japan . |
| 6-140697 | 5/1994 | Japan . |

*Primary Examiner*—Leon Scott, Jr.
*Attorney, Agent, or Firm*—Staas & Halsey

[57] ABSTRACT

A laser oscillator which is capable of preventing damage caused by light reflected from a workpiece and a decrease in productivity resulting therefrom. Between a rear mirror and an output mirror within the laser oscillator is arranged a bending mirror. The bending mirror has a coating formed on the surface thereof, which reflects S-polarized light sufficiently but has a low reflectance with respect to P-polarized light. A laser beam is amplified between the rear mirror and the output mirror, and emitted through the output mirror. The laser beam output at this time is formed by S-polarized light. The S-polarized light is converted to a circularly polarized light by a zero-shifting mirror and a quarter wavelength mirror. The laser beam converted to the circularly-polarized light turns in a perpendicular direction at a mirror and is converged onto a workpiece by a condenser lens. Part of the laser beam irradiated onto the workpiece is reflected therefrom and returns along the same path that the emitted laser beam travelled. This reflected light input via the output mirror is formed by P-polarized light. The P-polarized light received back into the laser oscillator is attenuated when reflected from the bending mirror.

8 Claims, 2 Drawing Sheets

LASER OSCILLATOR

This application is a continuation of application Ser. No. 08/602,721, filed Feb. 21, 1996, now abandoned.

TECHNICAL FIELD

This invention relates to a laser oscillator for outputting a laser beam by applying excitation potential thereto, and more particularly, to a laser oscillator having at least one bending mirror.

BACKGROUND ART

Laser beam machining is a method of vaporizing or melting a workpiece by irradiating onto very small portions of the same a high-density-energy laser beam which is obtained by generating an extremely coherent, monochromatic light and then converging the light by a condenser lens. The laser beam is excellent in controllability, which enables the laser beam machining to be employed in cutting complicated shapes, very small articles with high accuracy, and so forth, under the control of a numerical control unit.

A laser beam machine for carrying out such laser beam machining suffers from a significant problem to be solved, i.e. a problem of dealing with light reflected from a workpiece. This problem is very serious especially in cutting or welding highly reflecting materials, such as aluminum and copper. Another problem is marks made by the reflected light when the machining head is moved with the shutter open for high-speed machining.

A low-loss optical resonator is formed between the workpiece and the rear mirror within a laser oscillator, which instantly amplifies the laser power of the light reflected back from the workpiece into the laser oscillator, to an extremely high level. Consequently, various kinds of mirrors arranged within the laser oscillator are damaged, which degrades the reliability of the laser beam machine.

There are two conventional methods of preventing such damage of reflecting mirrors caused by reflected light.

A first method controls input electric power such that the laser power in the laser oscillator is kept at a constant level through a fast power feedback.

A second method detects the reflected light outside the laser oscillator and interrupts the laser oscillation when the reflected light is detected in a large quantity.

Whichever of the above methods may be employed, it is required to interrupt machining when the reflected light arises. In the first method, while the total laser power inside the laser oscillator is kept at a constant level, the power of the laser beam generated by the oscillator itself is reduced by the quantity of the reflected light. A laser beam suitably used for machining is one generated by the oscillator itself. Therefore, a decrease in the power of this laser beam leads to changes in machining conditions. To avoid the changes, it is required to interrupt machining. The second method, which stops laser oscillation, necessarily interrupts machining as well.

Furthermore, both the above methods require a very expensive laser detector. And even if such a high-priced laser detector is used, it is impossible to prevent marks from being made by faint reflected light.

DISCLOSURE OF THE INVENTION

The present invention has been made in view of these circumstances, and the object thereof is to provide a laser beam machine which is capable of preventing the light reflected from a workpiece from causing damage to its laser oscillator, and decreasing productivity.

To achieve the above object, the present invention provides a laser oscillator for outputting a laser beam, comprising at least one bending mirror having a high reflectance with respect to S-polarized light and a reflectance with respect to P-polarized light which is low enough to prevent the P-polarized light from being amplified.

The laser beam emitted from the laser oscillator is formed by an S-polarized light which the bending mirror reflects sufficiently. This laser beam is converted to a circularly polarized light and irradiated onto a workpiece. The light reflected from the workpiece returns into the laser oscillator in the form of P-polarized light which has a plane of polarization inclined at an angle of 90° to that of the S-polarized light. Since the bending mirror within the laser oscillator has a low reflectance with respect to P-polarized light, the P-polarized light is prevented from being amplified within the later oscillator.

This prevents the light reflected from the workpiece from causing damage to the reflecting mirrors of various kinds within the laser oscillator, and dispenses with interruption of machining. Therefore, it is possible to maintain the high reliability and productivity of the laser beam machine.

BEST MODE OF CARRYING OUT THE INVENTION

Embodiments of the present invention will now be described with reference to the drawings.

Figure 1:
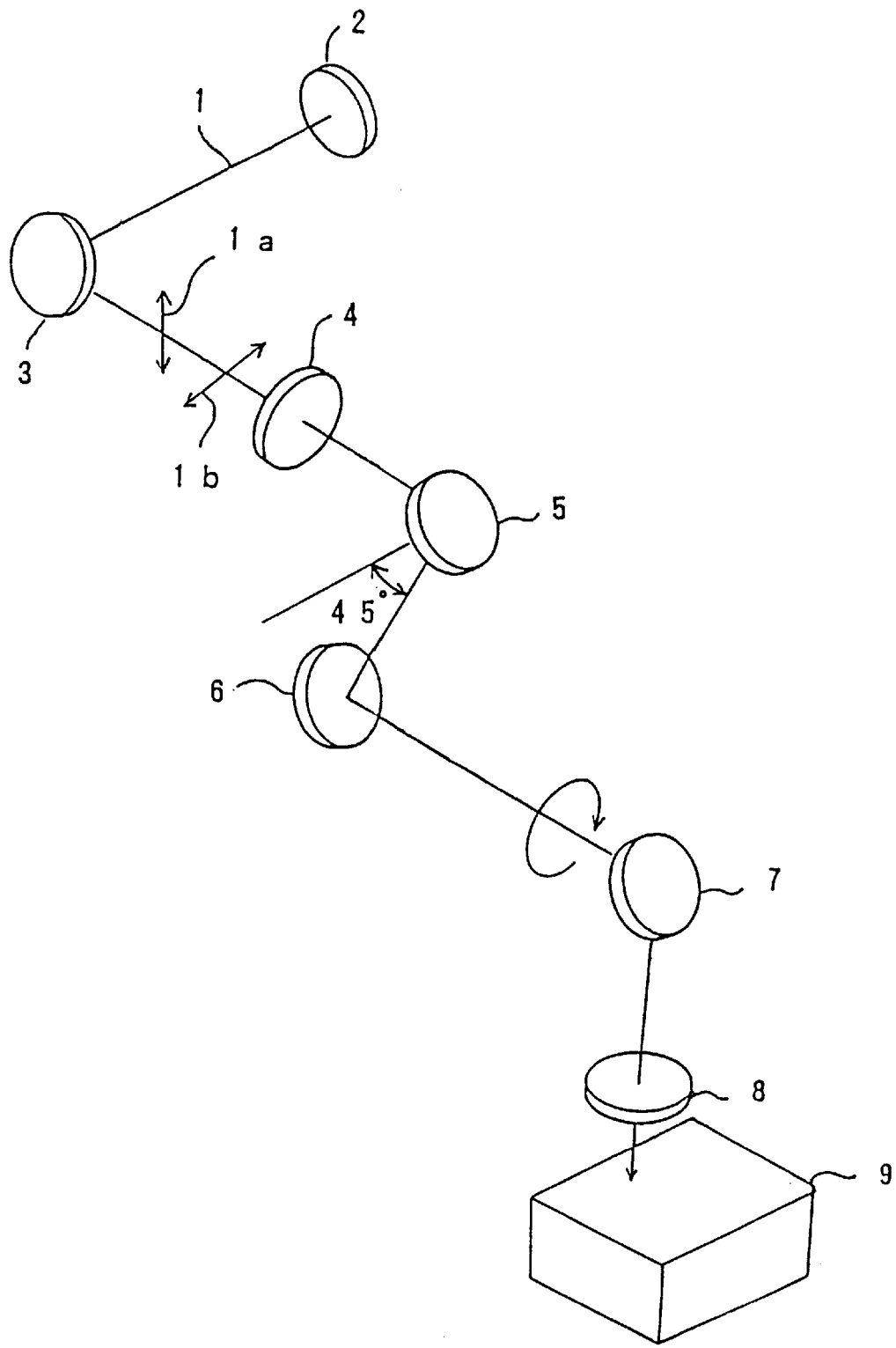
FIG. 1 is a diagram illustrating the optical system of a laser beam machine according to a first embodiment of the invention.

FIG. 1 is a diagram illustrating the optical system of a laser beam machine according to a first embodiment of the invention. Between a rear mirror 2 and an output mirror 4 is arranged a bending mirror 3. The bending mirror 4 has a coating formed on the surface thereof, which reflects almost 100% of S-polarized light but has a low reflectance with respect to P-polarized light. A laser beam 1 is amplified between the rear mirror 2 and the output mirror 4, and the intensified laser beam is emitted out through the output mirror 4. The laser beam 1 output at this time is formed by an S-polarized light. The S-polarized light 1a is a linearly polarized light which has a plane of polarization perpendicular to a plane (plane of incidence) containing the incident light and reflected light of the laser beam reflected at the bending mirror 3.

The S-polarized light 1a is converted to a circularly polarized light by a zero-shifting mirror 5 and a quarter wavelength mirror 6. The laser beam 1 converted to the circularly polarized light turns in a perpendicular direction at a mirror 7 and is converged onto a workpiece 9 by a condenser lens 8.

Part of the laser beam 1 irradiated onto the workpiece 9 is reflected therefrom and returns along the same path that the laser beam 1 has been emitted therethrough. The reflected light input via the output mirror 4 is formed by a P-polarized light 1b. The P-polarized light 1b is a linearly polarized light having a plane of polarization inclined at an angle of 90° to that of the S-polarized light 1a.

The principle of conversion of the laser beam 1 from the S-polarized light, which is emitted, to the P-polarized light, which is received, will now be described. The laser beam in the propagation path is represented as a vector defined by components in a V-direction and an H-direction. The H-direction means a direction parallel to the optical axis of a circularly polarized light-forming block formed by the zero-shifting mirror 5 and the quarter wavelength mirror 6, and the V-direction means a direction perpendicular to the H-direction. It should be noted that the zero-shifting mirror 5, the mirror 7 and the condenser lens 8 have the same effects on both the emitted light and the reflected light received from the workpiece. Therefore, ignorance of these optical parts does not affect the conclusion.

The emitted light is expressed by the following formula:

$$Eil = \begin{pmatrix} EilH \\ EilV \end{pmatrix} = Ei \begin{pmatrix} \sin\omega t \\ \sin\omega t \end{pmatrix} \quad (1)$$

When the emitted light is reflected from the quarter wavelength mirror 6, the phase of the S-polarized light component is delayed by $\pi/2$. Accordingly, the light reflected therefrom is expressed by the following formula:

$$Eic = Ei \begin{pmatrix} \sin\omega t \\ \sin(\omega t - \pi/2) \end{pmatrix} = Ei \begin{pmatrix} \sin\omega t \\ -\cos\omega t \end{pmatrix} \quad (2)$$

This formula indicates a vector wherein the direction of polarization rotates in the angular frequency of $\omega$. when this light is reflected from the workpiece 9, the phase of each component changes by 180°, and it is expressed as follows:

$$Erc = Ei \begin{pmatrix} -\sin\omega t \\ \cos\omega t \end{pmatrix} \quad (3)$$

Further, the light reflected from the quarter wavelength mirror 6 is expressed by the following formula:

$$Erl = Ei \begin{pmatrix} -\sin\omega t \\ \cos(\omega t - \pi/2) \end{pmatrix} = Ei \begin{pmatrix} -\sin\omega t \\ \sin\omega t \end{pmatrix} \quad (4)$$

It is clearly understood from the formula (4) that the reflected light is a light polarized in a direction perpendicular to the light represented by the formula (1), which means that the reflected light is a P-polarized light.

This P-polarized light received back into the laser oscillator is attenuated when reflected from the bending mirror 3. This prevents the reflected light, i.e. the P-polarized light from being amplified, even if a large quantity of energy is input to the laser oscillator. In short, the light reflected from the workpiece 9 can never be amplified inside the laser oscillator.

The bending mirror 3, which, as described above, reflects the S-polarized light efficiently, but has a low reflectance with respect to P-polarized light, can be produced by adjusting the layer, thickness and material of the coating provided thereon.

Next, the suitable reflectance with respect to P-polarized light of the bending mirror(s) in a laser oscillator having at least one bending mirror will be described. In the following description, the reflectance of a bending mirror with respect to P-polarized light is represented by R, the amplification factor of the laser oscillator by m, and the number of bending mirrors by n. Assuming that the reflectance with respect to S-polarized light is 1 (100%), in order to prevent the P-polarized light from being amplified, the following formula (5) must be satisfied:

$$mR^{2n} < 1 \quad (5)$$

When this formula (5) is solved for R, the following formula (6) is obtained:

$$R < (1/m)^{1/2n} \quad (6)$$

When this formula (6) is applied to the laser oscillator described hereinabove with reference to FIG. 1 which has one bending mirror and of which the amplification factor is 6, the reflectance $R_1$ of the bending mirror with respect to P-polarized light is as follows:

$$R_1 < 0.408 \quad (7)$$

Since the reflectance with respect to S-polarized light is 1 (100%), a suitable reflectance of the bending mirror with respect to the P-polarized light is below 40% of the reflectance with respect to the S-polarized light. That is, with the laser oscillator having only one bending mirror, it is possible to prevent the P-polarized light from being amplified by setting the reflectance of the bending mirror with respect to P-polarized light to a value of 40% or less.

Figure 2:
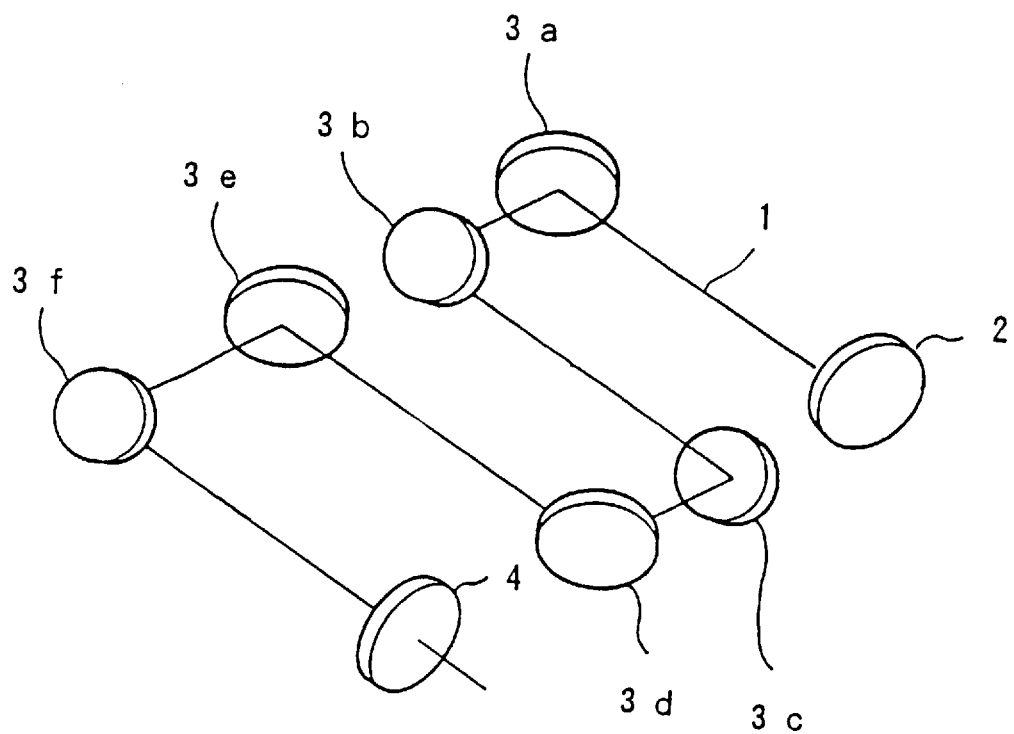
FIG. 2 is a diagram illustrating the optical system of a laser oscillator according to a second embodiment of the invention.

FIG. 2 is a diagram illustrating the optical system of a laser oscillator according to a second embodiment of the invention. This oscillator has six bending mirrors 3a to 3f arranged between the rear mirror 2 and the output mirror 4. The reflectance $R_2$ of the bending mirrors 3a to 3f with respect to P-polarized light for preventing the amplification of the P-polarized light within the laser oscillator, which is obtained by the use of the formula (6), is as follows:

$$R_2 < 0.861 \quad (8)$$

That is, in the laser oscillator having six bending mirrors, the amplification of the P-polarized light can be prevented by holding the reflectance of each bending mirror with respect to P-polarized light at 86% or less.

Thus, by setting the reflectance R of the bending mirrors with respect to P-polarized light to such a value as will satisfy the formula (6), it is possible to prevent the P-polarized light reflected from the workpiece from being amplified within the laser oscillator. This prevents the light reflected from the workpiece from causing damage to various kinds of mirrors, and hence the high reliability of the laser beam machine can be maintained. Furthermore, the arrangement of such a laser oscillator remains simple and bending mirrors employed are very inexpensive, which enables the whole machine to be produced at a low manufacturing cost.

Further, since the reflected light from the workpiece is prevented from being amplified within the laser oscillator, there is no need to interrupt machining, which leads to a marked increase in the yield of products or acceptably-machined workpieces and hence improvement in productivity.

As described above, according to the present invention, the amplification of the P-polarized light can be prevented by setting the reflectance of at least one bending mirror with respect to P-polarized light to a value lower than the reflectance of the same with respect to S-polarized light, which makes it possible to prevent the light reflected from a workpiece from being amplified within the laser oscillator.

What is claimed is:

1. A laser oscillator for outputting a laser beam, comprising:
   a laser device having reflective members therein to produce light having both P-polarized and S-polarized light components;

wherein said reflective members include at least one bending mirror having a high reflectance with respect to S-polarized light and a reflectance R with respect to P-polarized light which is low enough to prevent the P-polarized light from being amplified.

2. A laser oscillator according to claim 1, wherein the reflectance R of the said bending mirror with respect to the P-polarized light satisfies the following formula, provided that the reflectance of said bending mirror with respect to the S-polarized light is 1, the amplification factor of a laser beam is m, and the number of said bending mirrors is n:

$$R<(1/m)^{1/2n}.$$

3. A laser oscillator according to claim 1, wherein the reflectance R of said bending mirror with respect to the P-polarized light is 86% or less when an amplification factor of the laser beam is 6 and when the number of said bending mirrors is 6.

4. A laser oscillator according to claim 1, wherein the reflectance R of said bending mirror with respect to the P-polarized light is equal to 40% or less when an amplification factor of the laser beam is 6 and the number of said bending mirrors is 1.

5. A laser oscillator comprising:

a source of laser energy to produce laser light having both P-polarized and S-polarized light components; and a bending mirror to change a direction of said laser energy, wherein said bending mirror has a greater reflectance of said S-polarized light component than of said P-polarized light component.

6. A laser oscillator as claimed in claim 5, wherein the reflectance with respect to the P-polarized light prevents the P-polarized light from being amplified.

7. A laser oscillator as claimed in claim 5, wherein the reflectance of the bending mirror with respect to the P-polarized light satisfies the following condition provided that the reflectance of said bending mirror with respect to the S-polarized light is 1, the amplification factor of a laser beam is m, and the number of said bending mirrors is n:

$$R<(1/m)^{1/2n}.$$

8. A laser oscillator comprising:

means for generating a laser beam including both P-polarized and S-polarized light; and means for bending the laser beam, wherein said means for bending the laser beam has a greater reflectance of S-polarized light than of P-polarized light.

* * * * *